United States Patent [19]

Huei

[11] Patent Number: 5,544,357
[45] Date of Patent: Aug. 6, 1996

[54] DATABASE ACCELERATOR

[75] Inventor: Lin M. Huei, Revere, Mass.

[73] Assignee: Paracom Corporation, Woburn, Mass.

[21] Appl. No.: 451,479

[22] Filed: May 26, 1995

Related U.S. Application Data

[63] Continuation of Ser. No. 147,147, Nov. 2, 1993, abandoned.

[51] Int. Cl.⁶ .................................................. G06F 12/00
[52] U.S. Cl. .......................... 395/600; 364/DIG. 1; 364/DIG. 2; 364/958; 364/958.1; 364/974; 364/974.6; 364/252.3; 364/252.4; 364/282.1; 364/283.1
[58] Field of Search ........................ 364/DIG. 1, DIG. 2; 395/600

[56] References Cited

U.S. PATENT DOCUMENTS

| | | | |
|---|---|---|---|
| 3,651,483 | 3/1972 | Clark, IV et al. | 395/800 |
| 4,553,996 | 8/1985 | Hartung et al. | 364/200 |
| 4,575,798 | 3/1986 | Lindstrom et al. | 395/600 |
| 4,630,234 | 12/1986 | Holly | 395/600 |
| 4,633,391 | 12/1986 | Rundell | 395/800 |
| 4,644,471 | 2/1987 | Kojima et al. | 395/600 |
| 4,862,411 | 8/1989 | Dishon et al. | 364/952 |
| 4,939,598 | 7/1990 | Kulakowski et al. | 360/48 |
| 5,073,854 | 12/1991 | Martin et al. | 395/425 |
| 5,129,074 | 7/1992 | Kikuchi et al. | 395/425 |
| 5,136,707 | 8/1992 | Block et al. | 395/600 |
| 5,206,939 | 4/1993 | Yanai et al. | 395/400 |
| 5,210,870 | 5/1993 | Baum et al. | 395/600 |
| 5,226,165 | 7/1993 | Martin | 395/600 |
| 5,261,065 | 11/1993 | Urabe et al. | 395/425 |
| 5,265,260 | 11/1993 | Hendricks | 395/800 |
| 5,283,894 | 2/1994 | Deran | 395/600 |
| 5,305,389 | 4/1994 | Palmer | 382/1 |

FOREIGN PATENT DOCUMENTS

4-256041  1/1993  Japan .

Primary Examiner—Robert B. Harrell
Attorney, Agent, or Firm—Fish & Richardson P.C.

[57] ABSTRACT

A hardware accelerator for managing a computer database. The accelerator includes a key memory for storing a map of record key values to record address values, a search processor for searching the key memory for a given key value and providing the associated record address value to the central processor, and a bus interface for interfacing the search processor and the key memory to the central processor. Database management software executing on the central processor requests a mapping from key values to record address values by issuing requests over the bus interface to the search processor. The accelerator also provides operations to add and delete entries in the key memory. The accelerator uses a modified binary search that is particularly useful for searching a memory in which the search values of the entries are not unique; the modified binary search finds the first entry in the memory matching a given value. At each iteration of the binary search, the CARRY generated by the comparison of the probed entry to the given value is used to alter the probe address calculated in the next iteration of the search. Instead of terminating when the given value is found, the search continues until the start and end addresses have converged on the first entry that matches the given entry.

17 Claims, 5 Drawing Sheets

DATABASE ACCELERATOR

This is a continuation of application Ser. No. 08/147,147, filed Nov. 2, 1993, now abandoned.

BACKGROUND OF THE INVENTION

The invention relates to a apparatus and methods for accelerated processing of transactions on computer databases.

A computer database is a collection of data records, each having one or more logical keys that serve as "names" for the records. Typically, when an application program requests access to a record in the database, it presents a logical key value to a database manager program, which in turn consults information from an index kept on disk or in memory to map the logical key value to a record address value. This record address value specifies the location on the disk where the data record(s) associated with the logical key value is to be found. Thus, the database index functions very much like a book's index: a reader provides a logical key value (the topic of interest), and the index in return provides a record address value (the page number) where the information is to be found.

A database may have multiple keys. Typically one is selected as a "primary key" that provides unambiguous and rapid access to the record, and "secondary keys" provide access that is either slower or less specific to a single record. For instance, an employee database may use employee number as its primary key, and employee name and department number as secondary keys. The key index is a permanent part of the database as it resides on disk. It may either be stored in the same file as the data records themselves (like a table of contents bound in a common binding with the text of a book), or may reside in separate files (like the index/overview volume of a multi-volume encyclopedia.)

Known database management systems divide into two logical layers: an upper layer called the database manager provides a user interface (for instance, a database query language), and a lower layer called a database engine maintains the structure of the database, that is, the relationship between the logical keys and the physical data actually stored in the database file.

SUMMARY OF THE INVENTION

In a first aspect, the invention provides a hardware accelerator for managing a computer database. The accelerator includes a key memory for storing a map associating record key values to record address values, a search processor for searching the key memory for a given key value and providing the associated record address value to the central processor, a bus interface for interfacing the search processor and the key memory to the central processor, and database management software for execution on the central processor that requests a mapping from key values to record address values by issuing requests over the bus interface to the search processor.

Preferred embodiments of the invention may include the following features. The key memory map may store mappings from a single key value to multiple record addresses, for instance for non-unique secondary keys. The search processor may include structure for searching the key memory with a binary search structure that provides the first entry of the key memory matching a given key value. The database management software has structure for performing a mapping from a logical key value to an encoded key value before providing a key value to the search processor for mapping to a record address. The central processor includes structure for allocating the key memory. An index file stored on a disk memory of the host computer may store an image of the contents of the key memory. There may be a memory port through which the central processor can read and write the key memory. The search processor may provide to the central processor an index of an entry of the key memory corresponding to the given key value, and the database management software may then read entries from the key memory corresponding to the index. The database accelerator may include structure for adding and/or deleting entries to/from the key memory.

In a second aspect, the invention features a modified binary search, particularly useful for searching a memory in which the search values of the entries are not unique. The modified binary search finds the first entry in the memory matching a given value. As in a normal binary search, the entries are stored in the memory in sorted order. A probe address, the average of a start and end address, is formed, and the corresponding entry probed. Depending on a comparison of the probed entry with the given value, either the start or end address is set equal to the probe address. The modification exploits the CARRY generated by the comparison of the probed entry to the given value to alter the probe address calculated in the next iteration of the search. Instead of terminating when the given value is found, the search continues until the start and end addresses have converged on the first entry that matches the given entry.

Among the advantages of the invention are the following. A database manager using the database accelerator runs much faster than one without an accelerator because mapping a logical key value to a record address value can be accomplished without accessing the disk copy of the index information. The invention offers a copy-proof feature to a database software vendor: an illicit copy of the database management software is useless without the database accelerator board. Prior software database engines have forced a tradeoff between fast access for search purposes, but slow access for addition or deletion of records (typical of hierarchical organization) and fast addition or deletion of records, but slow search (typical of relational databases). In contrast, the invention performs both search and update functions at speeds much faster than either software database engine, and is simpler to design.

Other advantages and features of the invention will become apparent from the following description of a preferred embodiment, and from the drawing, in which:

DESCRIPTION OF THE PREFERRED EMBODIMENTS

Figure 1:
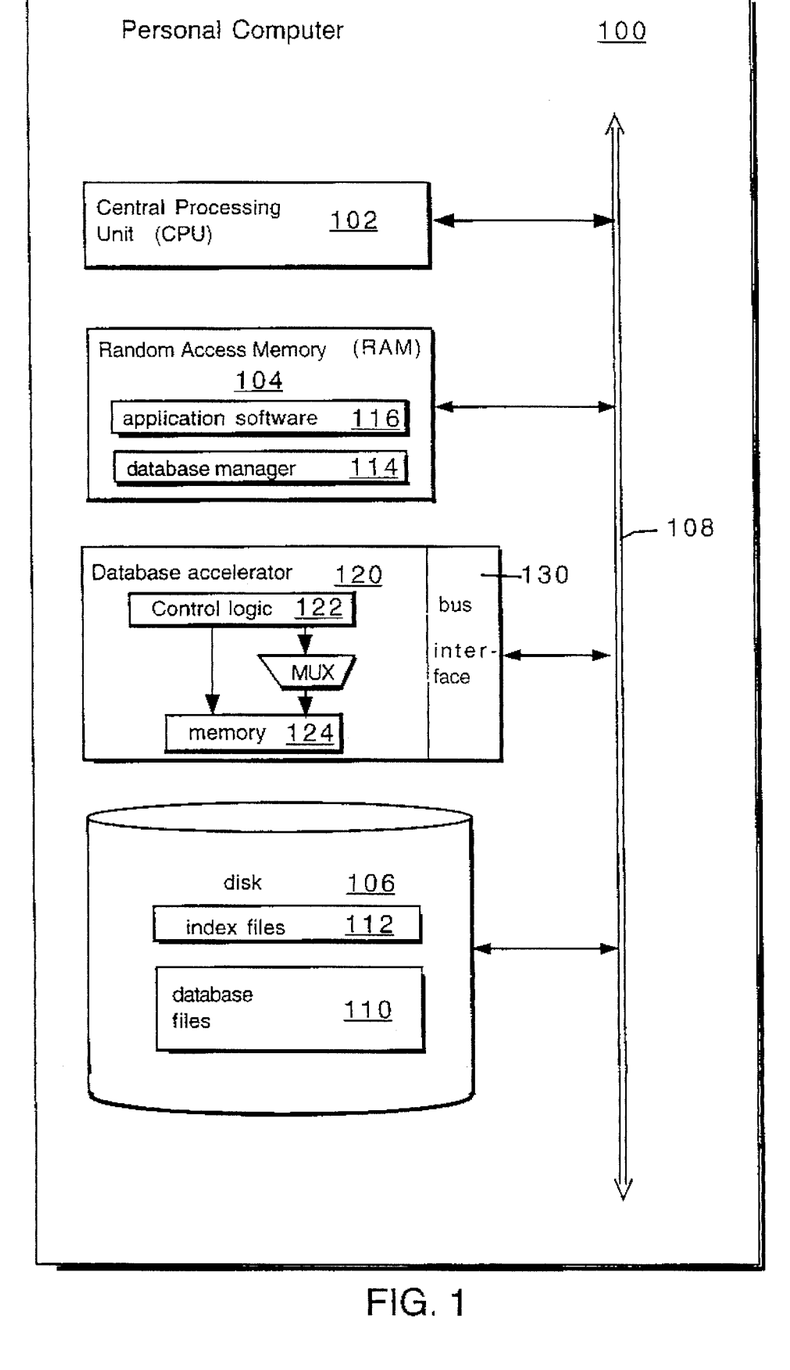
FIG. 1 is a block diagram of a computer with a database accelerator.

Referring to FIG. 1, personal computer 100 has a central processor unit (CPU) 102, a random access memory (RAM) 104, and a disk or other mass storage unit 106, all communicating over a system bus 108. Disk 106 holds the data 110 and index 112 files that constitute a database, and CPU 102 runs database management software 114 and application software 116 stored in RAM 104. A database accelerator 120 also communicates over bus 108, and has a control logic 122 and a key memory 124.

During a start-up phase, discussed below, the index information to map logical key values to record address values is loaded into key memory 124 from index file 112 for fast access.

Figure 4A:
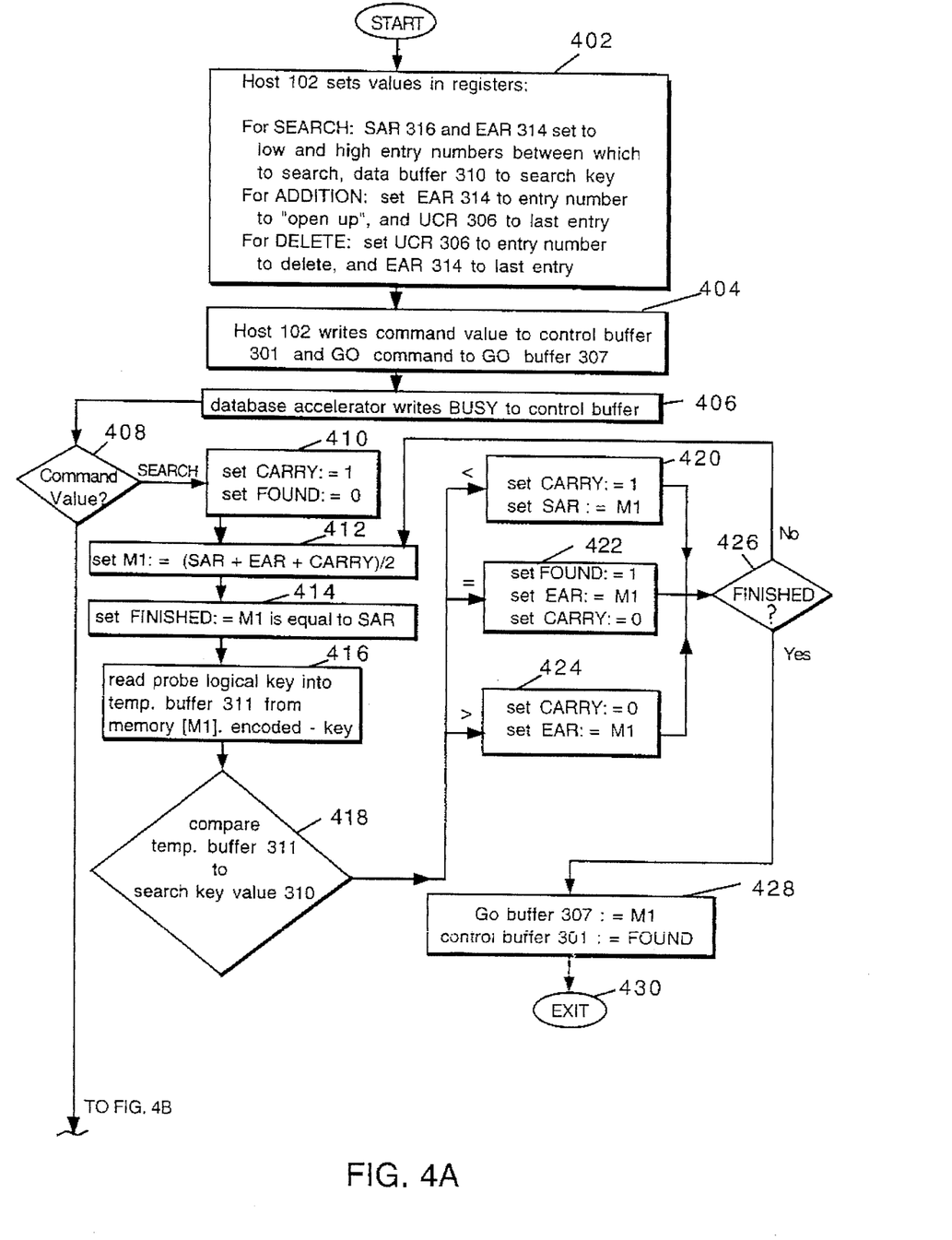
FIGS. 4A and 4B are a flow chart of the operation of the database accelerator.
Figure 4B:
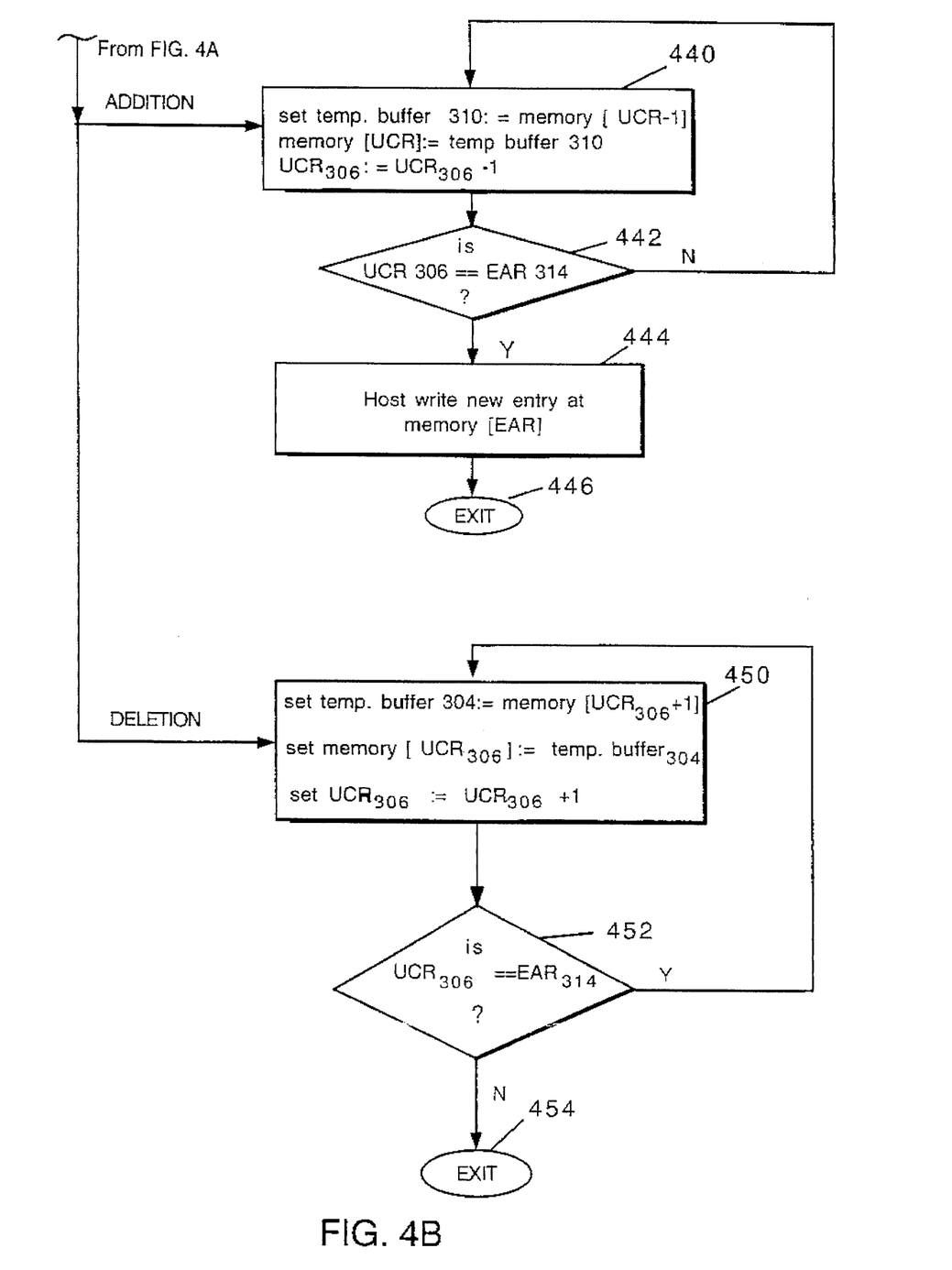

In general operation, application software 116 requests an operation from database manager 114. If the request is one of SEARCH, ADDITION, or DELETION, database manager 114 in turn passes the request to database accelerator 120 over system bus 108 through a bus interface 130, bypassing the step of accessing database index file 112. Considering a SEARCH operation as a typical operation performed by database accelerator 120 (SEARCH, ADDITION, and DELETION will be discussed in greater detail below, in connection with FIG. 4), database manager 114 presents a logical key value to database accelerator 120 and a command to SEARCH for the logical key. Within database accelerator 120, control logic 122 (which may be a state machine) directs the requested operation in the accelerator's key memory 124. If the logical value is found in key memory 124, control logic 122 provides a record address value associated with the logical key value to database manager 114, which can then access the appropriate database record in database file 110.

Figure 2:
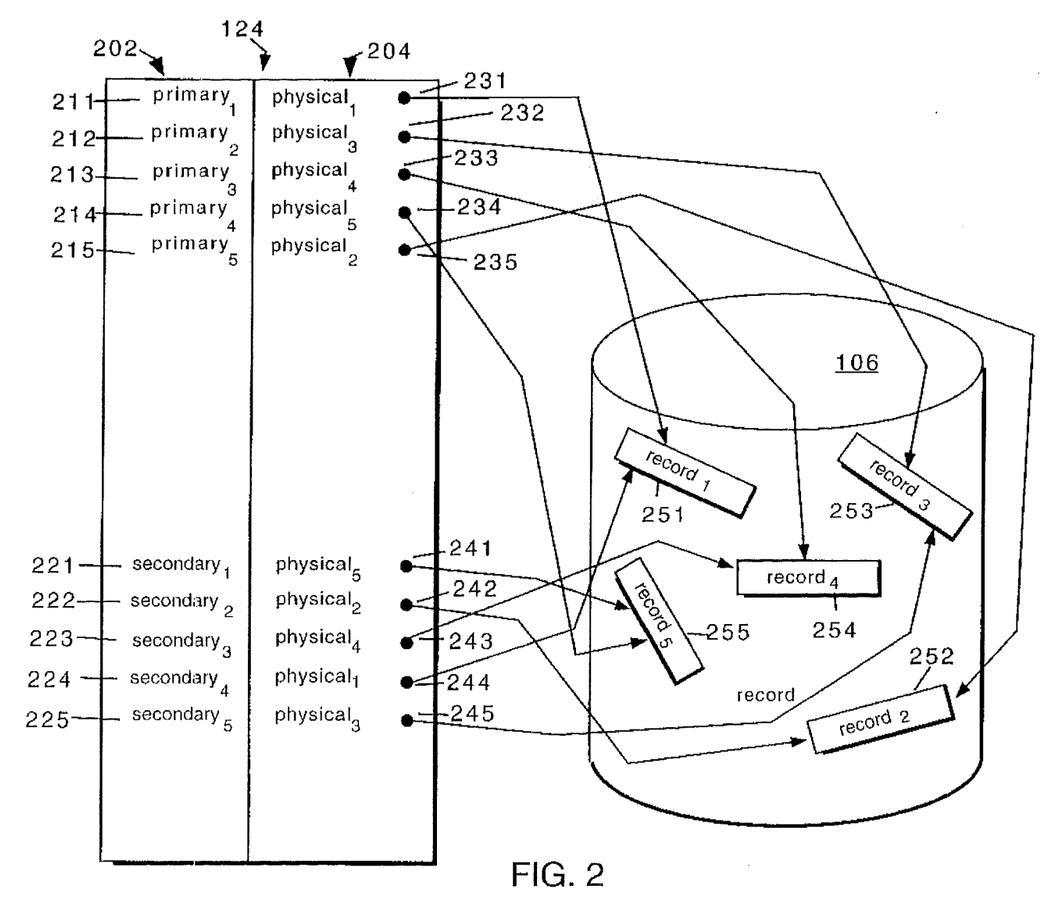
FIG. 2 shows disk records of a database, and a database accelerator having a key memory.

Referring to FIG. 2, the database accelerator's key memory 124 is organized as if it had two columns, a left column 202 for encoded logical key values and a right column 204 for the associated record address values. In FIG. 2, database 110 with index 112 is illustrated as having five data records, each with primary and secondary keys. During the start-up phase, these primary and secondary encoded logical keys were loaded, with their associated record addresses, into key memory 124, in sorted order according to their key values. During general operation, control logic 122 directs a search of left column 202 for an encoded logical key value 211–215 or 221–225. When the encoded logical key value is found, the corresponding entry in the right column is the record address value 231–235 or 241–245 for the record 251–255. Thus, key memory 124 serves as a cache over the information in index file 112.

Figure 3:
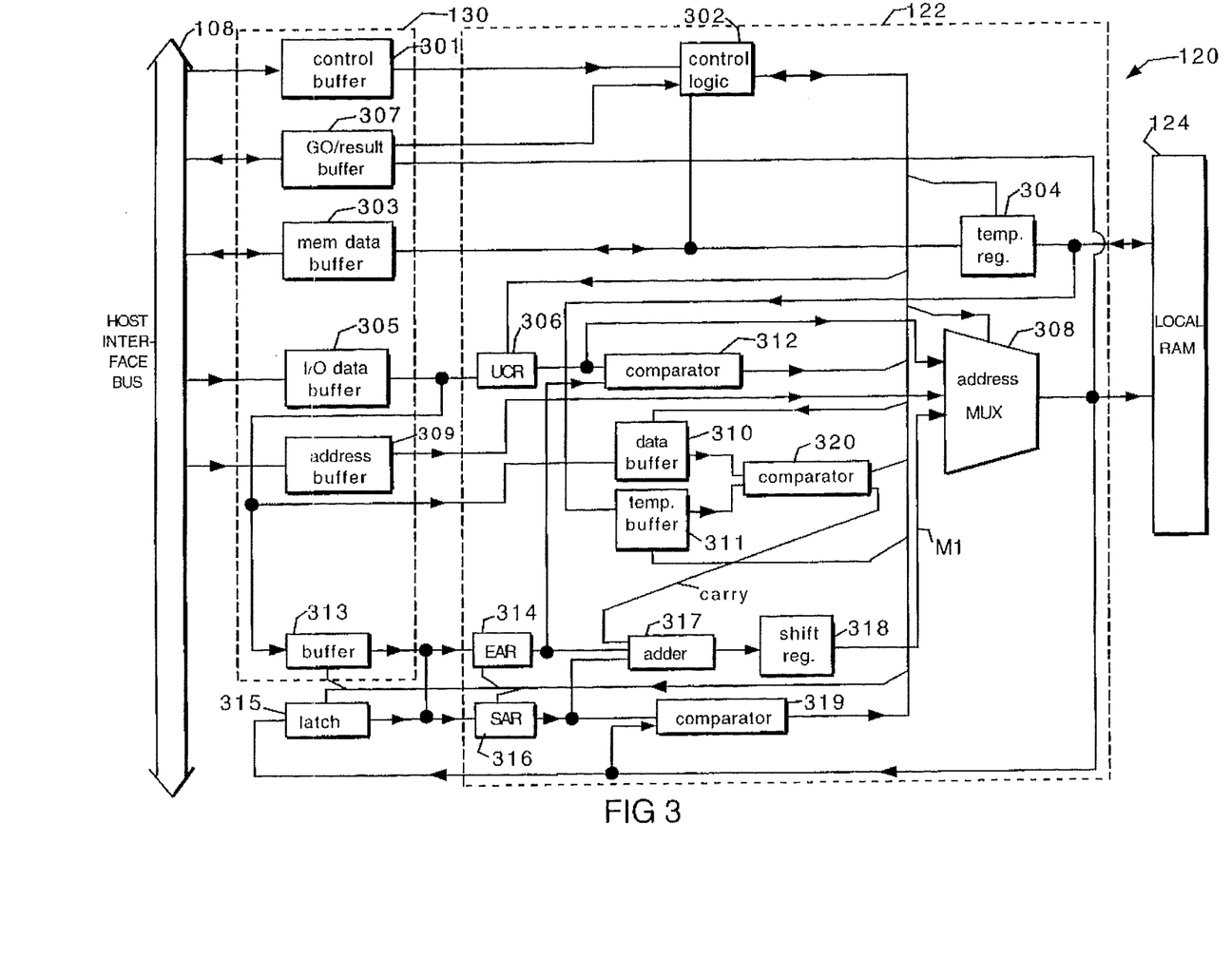
FIG. 3 is a block diagram of the database accelerator.

Referring to FIG. 3, database accelerator 120 has a bus interface 130 whose design is largely determined by the bus protocol of the host computer, for instance the AT, ISA, EISA, Microchannel, or Macintosh bus architectures found on various models of personal computers. The logic of FIG. 3 may be implemented in any convenient technology, for example, custom VLSI, gate arrays, field-programmable gate arrays, programmable logic arrays (PALs), a bit-slice processor, or a microprocessor. Key memory 124 is sized to hold the desired keys of database 110, typically 256 kB.

Database accelerator 120 has a number of data and control registers that are mapped into the memory space of host processor 102. Host processor 102 typically requests a service from database accelerator by writing values into the registers, for instance a value to search for, the low and high bounds of the region of key memory to search, a command value (for instance SEARCH), and a GO command. While database accelerator 120 services the request, host processor 102 can await the completion of the operation either by performing other functions or by executing a spin wait on a status register of the database accelerator. These steps are discussed in greater detail below.

Key memory 124 can be read and written by the host. To access key memory, host 102 writes a memory LOAD or UNLOAD command into control buffer 301. In response, address multiplexer passes the address value of address buffer 309 to key memory 124. When control buffer 301 is set to LOAD, any data value written to memory data buffer 303 will in turn be written to key memory 124 at the address specified in address buffer 309. Similarly, when control buffer 301 is set to UNLOAD, the cell value addressed by address buffer 309 will be copied to memory data buffer 303 for the host to read. Because key memory 124 is typically quite large, control buffer 301 stores high address bits moving a "window" over key memory 124; the low order address bits are stored in address buffer 309.

The start-up phase, now discussed in greater detail, proceeds as follows. Key memory 124 is loaded with encoded logical key/record address value pairs. The encoded logical key values are stored in one column 202 of key memory 124 as 16-bit encoded key values; and host processor 120 maps each arbitrary-length logical key value to a 16-bit encoded key value by any convenient method, for instance by a known hash function such as CRC (circular redundancy check). Thus, several logical key values may map to the identical encoded key value, and can have different record addresses. The record address values column in FIG. 2 are stored in a second column 204 as 16-bit integers, representing record numbers within database file 110. To load key memory 124, host database software 114 obtains from the database 110, 112 a count of the number of records and the logical and record address values for the database records, and selects which encoded logical key and record addresses will be stored in key memory 124. For instance, index file 112 may store the encoded logical keys and record addresses in exactly the format used in key memory 124 in which case it is possible to load key memory 124 by simply copying the index from index file 112 to key memory 124. Or, host database software 114 may read the records of database file 110, extract the logical keys, map them to 16-bit encoded keys, and store the encoded key/record address pairs in key memory 124 using the LOAD command described above.

Host database software 114 manages key memory 124, for instance apportioning key memory 124 among multiple logical keys. For instance, if key memory 124 has 4096 entries and database file 110 has three keys (typically a primary and two secondary keys), host database software 114 may decide to store the primary key in entries 0 through 1365, the secondary keys in entries 1366 through 2730, and tertiary keys in entries 2731 through 4095. Host database software 114 maintains the range of key memory apportioned to each logical key so that it can specify the correct bounds for each SEARCH, ADDITION, or DELETION request. The entries in key memory 124 are managed as required by the search strategy implemented by the search circuits of database accelerator 120. For instance, if database accelerator 120 uses a binary search, then the entries in key memory must stored in sorted order with no gaps within the range allocated to a logical key.

FIG. 4 shows the operation of database accelerator 120 after key memory 124 has been apportioned and loaded. In step 402, host processor 102 writes command and data values to several of the accelerator's data registers, whose uses are specialized for each operation as discussed below. Compare step 408 discriminates between the various commands the SEARCH, DELETION, and ADDITION operations, each of which are discussed below.

Referring now to FIGS. 3 and 4, the SEARCH command uses a binary search to locate the first key value in a selected range of key memory corresponding to an encoded key value, and thus the entries of key memory 124 are stored sorted in ascending order by encoded key value 202. In step 402, host processor 102 stores the entry numbers of key memory 124 between which to search in a start address register SAR 316 and an end address register EAR 314. The encoded key value to search for is stored in a data buffer 310. A value specifying the SEARCH command is stored in a control buffer 301. Once these data have been stored in the respective registers in steps 402 and 404, host 102 writes a GO signal into the GO/result buffer 307 in step 404.

In step 406, database accelerator 120 responds by setting the value of control buffer 301, as read by host processor 102, to BUSY. In step 408, a control logic 302 determines which command to execute and controls the logic of database accelerator 120 to perform the appropriate command. The SEARCH procedure begins at step 410. A CARRY signal out of a comparator 318 is set to One by control logic 302. In later steps of the search, this CARRY signal is automatically generated by comparator 320 and is used to modify the normal rules for binary search so that if a selected encoded key value appears multiple times in key memory 124, the search will terminate at the sequentially first of these multiple entries instead of at the first hit. The FOUND signal is also set to Zero at step 410. This FOUND signal indicates whether any entries in key memory 124 match the encoded logical key value, and thus whether the search has succeeded. In step 412, an adder 317 adds the contents of SAR 316, EAR 314, and CARRY, and divides by two in a shift register 320, to form value M1, the address in key memory 124 to probe in this step of the binary search. In step 414, a FINISHED flag records the value of M1 is compared to the current value of SAR 316 via comparator 319, indicating that this is the last probe of the binary search. Looking ahead to step 426, if the FINISHED flag was set in 414 then this probe at entry M1 is the final probe of the binary search, and the search can terminate on this iteration.

In step 416, M1 is multiplexed through an address multiplexer 308 to address key memory 124. The encoded key/record address value at entry M1 of key memory 124 is loaded into a temporary buffer 311. In step 418, the search key value from data buffer 310 is compared to the probed encoded key value 311 by a comparator 320. Control logic 302 uses the outcome of comparator 320 to determine whether the probed encoded key value is less than, equal to, or greater than the search key value. In step 422, if the search key value and the probed key value are equal, then the CARRY out of comparator 320 is cleared (CARRY:=0). Control logic 302 sets the FOUND flag (FOUND:=1), and replaces the contents of EAR 314 with the value of M1. In step 420, if temporary buffer 311 (holding the probed key value) is less than data buffer 310 (holding the search key value), then value M1 is latched from address MUX 308 to SAR 316, and CARRY is set (to One). Otherwise, in step 424, the probed key value 311 is greater than search key value 310; and address M1 is latched from address MUX 308 to EAR 314, and CARRY is cleared. Note that the binary search does not halt on a match of the search key value with an encoded key value from key memory 124; the binary search continues until the low bound SAR 316 for the search and high bound EAR 314 have closed in on the first entry in key memory 124 that matches the search key value stored in data buffer 310.

At step 426, when the binary search has closed (that is, the contents of the EAR 314 (equal to the value M1) is within one of the contents of the SAR, M1 points to the first entry in key memory 124 matching the encoded key value, if such an entry exists between the original SAR and EAR values specified. If the FOUND flag was set in step 422, it is known that there is at least one matching entry. Thus a Yes comparison at 426 directs the processor to step 428, where the value M1 is written into GO/result buffer 307, and the FOUND status value is written into control buffer 301. A No comparison indicates that the binary search must continue, with the difference between EAR and SAR closed in half.

The database accelerator's search operation is complete at step 430. If the host processor 102 has been busy waiting on control buffer 301, it can now continue execution. Host processor 102 reads the M1 value from GO/result buffer 307, which in turn specifies an entry in key memory 124 to read. If the encoded key of this entry matches the sought encoded key, then the low 16 bits of this entry will specify a record to read from database file 110. Host processor 102 will typically read the indicated record from database file 110.

Because there may be multiple records with identical encoded key values (particularly for secondary keys where the logical keys themselves may be non-unique), it will typically be necessary to examine all records with the sought encoded key value. Search procedure 410–430 provided only the first entry of key memory matching the sought encoded key value; host processor 102 will typically use the UNLOAD command described above to read successive entries from key memory 124 and records from database file 110 until the encoded key value read from key memory 124 no longer matches the sought-for encoded key.

The DELETION and ADDITION operations are illustrated in flow chart steps 440–452. Since the array of encoded key and record address value pairs must remain dense (there may not be any holes in the key memory space dedicated to a particular logical key), ADDITION works by moving the portion of the array higher than the inserted key value up by one key memory location; host processor 102 then writes the new encoded key and record address pair into the selected location. DELETION, steps 450–454, works by copying the upper portion of the key memory down by one entry. Host database software 114 updates its end value so that the correct EAR value can be used to properly bound the next operation on key memory 124.

To execute an ADDITION (DELETION) command, in steps 402–404 host processor 102 writes a key memory entry number for the insertion (deleted) memory location to UCR 306, the last valid entry number to EAR 314, an ADDITION (DELETION) command value to control buffer 301, and a GO signal to GO buffer 307. In step 406, control logic 302 sets the value of control buffer 301 to BUSY, and to FOUND or NOTBUSY when the data movement is complete. In steps 440–442 (450–452), an ADDITION (DELETION) command moves all entries above the entry specified in UCR 306 up (down) by one entry. When an ADDITION command is completed by the database accelerator, one entry in the key memory will be duplicated, and a new entry can be written over the first one of the duplicates using the LOAD command described above. An ADDITION (DELETION) command is complete in step 446 (454).

The key map 124 is kept consistent with database file 110, for instance after DELETION and ADDITION commands. Some of the techniques used in traditional software database engines are usefully exploited, and some techniques can be dramatically simplified. The database manager 114 running on host computer 102 maintains a log file of transactions that records all transactions that write to the database file. A log file of transactions is maintained to assist in crash recovery.

Because index searches, insertions, and deletions happen at RAM speeds in key memory 124 instead of at disk speeds in index file 112, the complex index files 112 (and complex database engine software to manipulate the index files) commonly used to obtain acceptable performance from hierarchical database managers are unnecessary. An index file that is simply an image of the key memory's 124 encoded key/record address pairs is sufficient, and can be updated infrequently, for instance when the user signs off for the day. If the computer crashes without updating index file 112 to consistency with database file 110, index file 112 can be regenerated from the records in database file 110. When the user exits normally, the host reads the entries from key memory 124 using its access window, and stores an image of key memory 124 to index file 112, bringing index file 112 into consistency with database file 110. When the user next logs into the database, key memory 124 can be loaded directly from index file 112.

After host database software 114 issues a command to database accelerator 120, host processor 102 enters a spin wait waiting for the database accelerator to set an "operation complete" status code in control buffer 301. The database accelerator is sufficiently fast that, for instance, a search of 64K entries in a 256K memory which uses sixteen probes, is completed in 937 ns for a 16 MHz database accelerator clock, two or three iterations of a spin loop for the host processor.

Other embodiments may organize the key memory differently. For instance, for a large database, it may be desirable to use 32-bit (or larger) representations for the encoded key and record address. A length register might specify a length for the encoded key value, or a type register would specify a collating sequence for logical keys. The record address may be stored in any convenient representation, for instance storing the disk volume, cylinder, head, and record at which to find the data record. The key memory can be organized to use any convenient search technique, for instance B-trees, hash tables, a Fibonaccian search, or an interpolation search. The choice of key memory organization may be influenced by the relative frequency of insertions and deletions with respect to searches.

Other embodiments are within the following claims.

What is claimed is:

1. Apparatus for managing a database stored in association with a host computer, said database having a plurality of records each identified by a record address value and at least one logical key value, the host computer having a central processor, the apparatus comprising:

a database accelerator apparatus for incorporation into the host computer, comprising:

a key memory for storing a map of key values of records of said database to record address values of said records;

a search processor for searching said key memory for a given key value in response to requests from the central processor, and providing the record address value associated therewith to the central processor;

a key memory manager for adding new map entries to say key memory, a new map entry relating a key value of a newly-created record of said database to a record address value of said newly-created record, and for deleting a map entry from said key memory when a record is deleted from said database;

a bus interface for interfacing said database accelerator to the central processor and software executing thereon; and database management software for execution on said central processor, said database management software being a general purpose software system for providing database creation and configuration, data addition and deletion, data alteration, and data search access to the database, said database management software configured to manage databases of user-defined configuration, to request a mapping from said given key value to said record address value by issuing requests to said search processor, and to request an update of said key memory by issuing a request to said key memory manager, said requests communicated through said bus interface.

2. The apparatus of claim 1, wherein said search processor comprises means for searching said key memory with a binary search means that provides the first entry of said key memory matching said given key value.

3. The apparatus of claim 2, wherein said binary search means comprises:

(a) means for storing said key values in sorted order in indexed entries of said key memory;

(b) means for providing a start address and an end address, said addresses corresponding to entry numbers of said key memory between which to search;

(c) means for providing a sought search value;

(d) means for providing an initial CARRY value and an initial FOUND value of False;

(e) means for forming a probe address by summing said start address, end address and CARRY, and dividing the sum by two;

(f) means for reading the key value of said key memory entry indexed by said probe address;

(g) means for comparing said search value to said read key value, and setting said CARRY value to Zero or One according to said comparing;

(h) means for setting said start address to said probe address, if said read key value is less than said sought value;

(i) means for setting FOUND to True and said end address to said probe address, if said read key value is equal to said sought value;

(j) means for setting said end address to said probe address if said read key value is greater than said sought value; and (k) means for iterating means (e) through (j) until said probe address equals said start address.

4. The apparatus of claim 1, further comprising mapping means for mapping a single key value to multiple record address values in said key memory map.

5. The apparatus of claim 1, wherein said database management software comprises means for performing an encoding from a logical key value to an encoded key value before providing said encoded key value to said search processor for said mapping.

6. The apparatus of claim 1, wherein said database management software comprises means for spin waiting while said search processor performs said search.

7. The apparatus of claim 1, wherein said database management software comprises means for allocating said key memory.

8. The apparatus of claim 1, further comprising:

an index file stored on a disk memory of said host computer, said index file storing an image of said key map of said key memory.

9. The apparatus of claim 1, further comprising:

a memory port through which said central processor can read and write said key memory.

10. The apparatus of claim 1 wherein said search processor provides to said database management software an index of an entry of said key memory corresponding to said given key value, and said database management software further comprises means for reading entries from said key memory corresponding to said index.

11. The apparatus of claim 1, the database management software being further configured to request addition and deletion of key and record address map values to said key memory in response to addition or deletion of records to said database.

12. The apparatus of claim 1, wherein a mapping request from the database management software to the search processor includes a value representative of a logical key of a record of said database, and in response the search processor provides to the database management software a value representative of a physical key of a record matching said logical key, the database management software configured to then use said physical key to retrieve said matching record from said database.

13. A method for manipulating records of a database stored on a computer associated memory, the database having a plurality of records each identified by a record address value and at least one logical key value, the method comprising the steps:

storing in a key memory of a database accelerator peripheral a map index from key values of said records to record address values, said map index reflecting a search key configuration of said database defined by a user of said database;

when a request to search for a record of said database is received from a user:
providing to said peripheral a key value of said sought-for record of said database;
searching said map index on said peripheral to determine a record address value associated with said provided key value, said searching performed by a processor of said peripheral;
communicating said determined record address from said peripheral to a central processor of a computer; and
referencing, by said central processor, a record of said database associated with said determined record address value;

when a request to create a new record in said database is received from a user:
creating said new record in said database in said computer associated memory; and
updating said map index to reflect said creation by storing a new key value and a new record address in said key memory, said new key value being associated with said new record, and said new record address value indicating a location in said database of said new record;

when a request to delete a record from said database is received from a user:
deleting said record from said database in said computer associated memory; and
deleting from said map index key values associated with said deleted record and the record address value of said deleted record.

14. The method of claim 13, further comprising the step of:

encoding a logical key value to an encoded key value before providing said key value to said search processor for said searching.

15. The method of claim 13, further comprising the steps of:

copying to said central processor an index of an entry of said key memory corresponding to said given key value; and reading entries from said key memory corresponding to said entry index by said central processor.

16. A method for searching a memory of entries each having a search value, the method comprising the steps:

(a) storing said entries in said memory in sorted order according to said search value;

(b) providing a start address and an end address, said addresses corresponding to entry numbers of said memory between which to search;

(c) providing a sought search value;

(d) providing an initial CARRY value;

(e) forming a probe address by summing said start address, end address and CARRY, and dividing the sum by two;

(f) reading the memory entry indexed by said probe address;

(g) comparing said search value to the value of said read entry, and setting said CARRY value to Zero or One according to said comparing;

(h) setting said start address to said probe address, if the search value of said read entry is less than said sought value;

(i) if the search value of said read entry is equal to said sought value, setting the end address to said probe address;

(j) if the search value of said read entry is greater than said sought value, setting said end address to said probe address; and (k) repeating steps (e) through (j) until said probe address equals said start address.

17. The method of claim 16, further comprising the step of:

(i') noting that an entry having a search value corresponding to said sought search value exists if the search value of said read entry is equal to said sought value.

* * * * *

UNITED STATES PATENT AND TRADEMARK OFFICE
CERTIFICATE OF CORRECTION

PATENT NO. : 5,544,357

DATED : August 6, 1996

INVENTOR(S) : Lin M. Huei

It is certified that error appears in the above-identified patent and that said Letters Patent is hereby corrected as shown below:

Column 4, line 56, -- be -- should be inserted after " must ".

Signed and Sealed this

Third Day of March, 1998

Attest:

BRUCE LEHMAN

*Attesting Officer*     *Commissioner of Patents and Trademarks*